July 10, 1962 R. TORJUSEN 3,043,627
ARTICLE OF FURNITURE
Filed Nov. 3, 1959 2 Sheets-Sheet 2

RUDOLF TORJUSEN
*INVENTOR.*

BY Karl F. Ross

AGENT.

United States Patent Office 3,043,627
Patented July 10, 1962

3,043,627
ARTICLE OF FURNITURE
Rudolf Torjusen, Kongsgaardalle 10C,
Kristiansand, Norway
Filed Nov. 3, 1959, Ser. No. 850,674
4 Claims. (Cl. 297—456)

My present invention relates to plastic bodies and, more particularly, to articles of furniture and processes for manufacturing the latter as disclosed in my co-pending application Ser. No. 699,578, now abandoned, filed November 29, 1957, of which the present application is a continuation-in-part.

Heretofore it has been the practice to manufacture large plastic bodies, such as articles of furniture, from sheets of a thermoplastic resin. Accordingly, these sheets were inserted in high-power presses and formed at temperatures in excess of their softening points. Furniture produced in this manner was hard and heavy, particularly if long-wearing, full-bodied articles were desired. It has also been known to produce objects from a light-weight plastic foam by forming the latter in presses with heated platens. These light-weight articles have not been able to withstand constant abuse and wear. Attempts at integrally molding a piece of furniture having a relatively rigid frame structure along with one or more resilient portions of reduced thickness, such as the seat and back parts of a chair, have resulted only in compromise solutions not fully satisfactory in either respect.

It is, therefore, the general object of the present invention to provide a process for integrally forming, in a single molding operation, an article of furniture having mechanically rigid portions and relatively soft and resilient portions merging imperceptibly into one another.

According to a feature of my invention, I form an article of furniture such as the shell of an easy chair, adapted to be provided with legs, in a mold charged with an expandable thermoplastic resin such as a polystyrene adapted to foam up in the presence of heat. The resin, advantageously, has been previously treated with an expanding agent and contains a substance which is gaseous at the operating temperature (e.g. petroleum ether) and which causes the expansion and consequent enlargement of the resin. The expanding agent is generally present as a homogeneous dispersion within the thermoplastic material. A part of the plastic charged into the mold may be pre-expanded in a heated chamber to produce portions of a finished object having a density substantially equal to that of the pre-expanded charge. I have found that by charging certain portions of a mold with expandable but still unexpanded plastic, while other portions are charged with the pre-expanded material, and then heating the mold to expand the unexpanded plastic to a limited extent, sufficient to fuse the entire charge into a single mass, I obtain a product having regions of great density, wear resistance and structural strength at the points at which the non-expanded plastic was applied, and regions of lesser density, greater resilience and increased porosity where the pre-expanded plastic had been used. Accordingly, by suitable choice of the quantities of pre-expanded and non-expanded plastic charged into the mold at different points thereof, it is possible to produce a one-piece article having regions predeterminedly varied in density, porosity, resilience, wear resistance and structural strength. An article of this description will be strong enough to support the weight of one or more persons even when molded to an overall density and specific weight sufficiently low to permit its use in airplanes and ships where weight saving is a factor and where, as in life-saving equipment, buoyancy is essential.

The above and other advantages, objects and features of the present invention will become more readily apparent from the following description, reference being made to the accompanying drawing in which.

Figure 1:
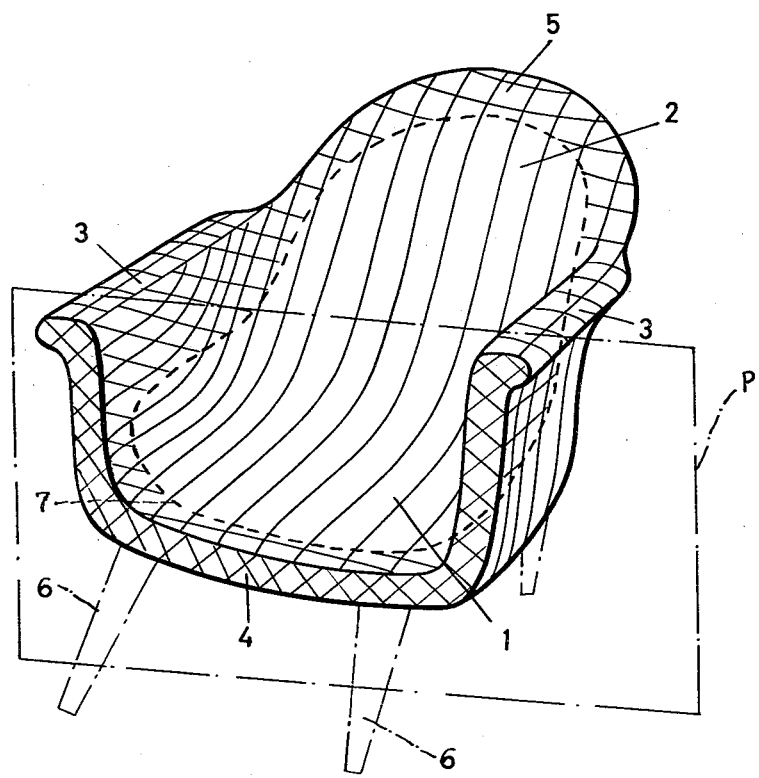
FIG. 1 is a perspective view of a chair shell produced by a process according to the invention.

In FIG. 1 I show an easy-chair body according to my invention comprising a seat 1, a back 2, armrests 3, a front edge 4 and a back edge 5, integrally formed in a single operation; the chair body can be provided with legs 6 (dot-dash lines) and upholstered if necessary. Since it is desirable that the seat and the back portions (framed by dotted line 7) of the chair be highly resilient, these portions are formed of a highly expanded plastic to produce a low-density, soft-surfaced strip needing no additional cushioning or padding. The armrests 3 and the edges 4, 5 suffer the greatest wear and strain, especially when a person is comfortably seated upon the chair, and are therefore formed of a plastic expanded to a greater density (less expansion) than the more resilient portions. The heavier and more rigid frame portions of the chair, indicated by wide cross-hatching, structurally support the less rigid and more resilient intermediate parts thereof.

Figure 2:
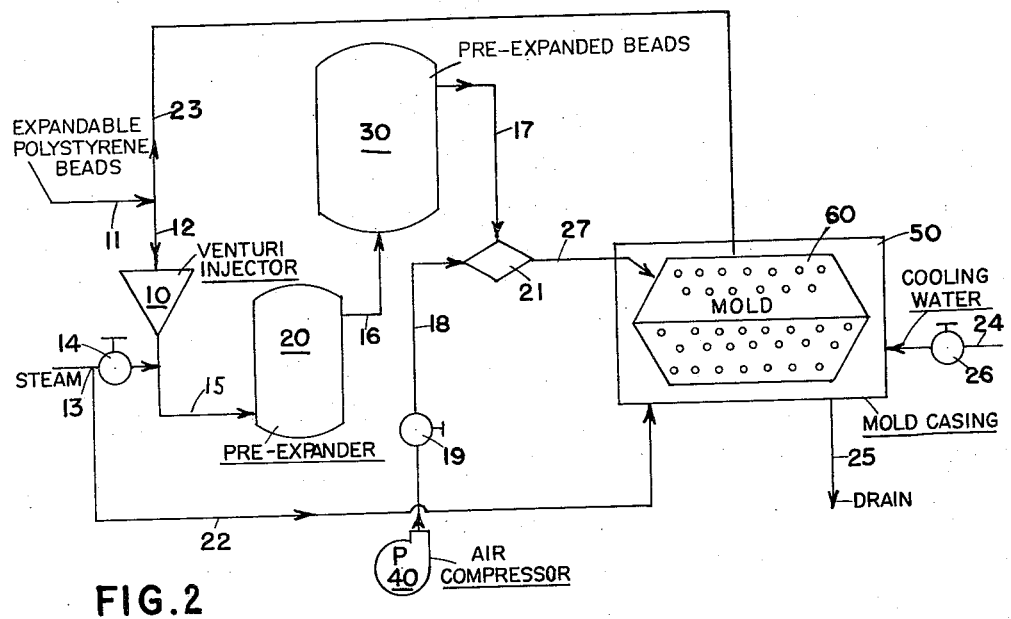
FIG. 2 is a flow diagram schematically illustrating the manufacture of plastic articles such as the chair of FIG. 1.

The chair of FIG. 1, or similar plastic bodies having portions expanded to different densities, may be readily produced by a process illustrated in the flow diagram of FIG. 2. A comminuted, freely flowing expandable plastic (e.g. polystyrene of 10 to 50 U.S. mesh), available in the form of beads under several trade names, is introduced via tubes 11 and 12 into the hopper of a venturi injector 10 whose jet aperture is connected to a source of steam presure by a pipe 13. This pipe is provided with a steam-regulating valve 14 adapted to control the velocity of the steam entering the jet aperture and, therefore, also the flow of the plastic beads through the venturi injector 10 and into a pre-expansion chamber 20 via pipe 15. The pre-expander 20 expands the beads, under the influence of heat provided from the steam source, to a predetermined density controlled by the rate of flow of the beads through the chamber and the length of time the heat therein remains in contact with the beads. The pre-expanded plastic beads are conveyed via a duct 16 to a drying and storage chamber 30 wherein excess moisture is removed. From chamber 30 the pre-expanded and dried beads are conducted by a duct 17 to an air chamber 21 which is connected to an air compressor, schematically shown as a pump 40, via a pipe 18 and an air-control valve 19. From chamber 21 the beads are blown, via pipe 27, into the interior of a perforated mold 60 within a steam chest 50. The steam chest is connected to the steam source by a pipe 22 and to a source of cooling water by a pipe 24 having a control valve 26. Chest 50 is provided with a drain 25. From their source, some of the plastic beads are conveyed in their unexpanded state to the mold 60 and deposited therein as schematically shown by line 23.

Figure 3:
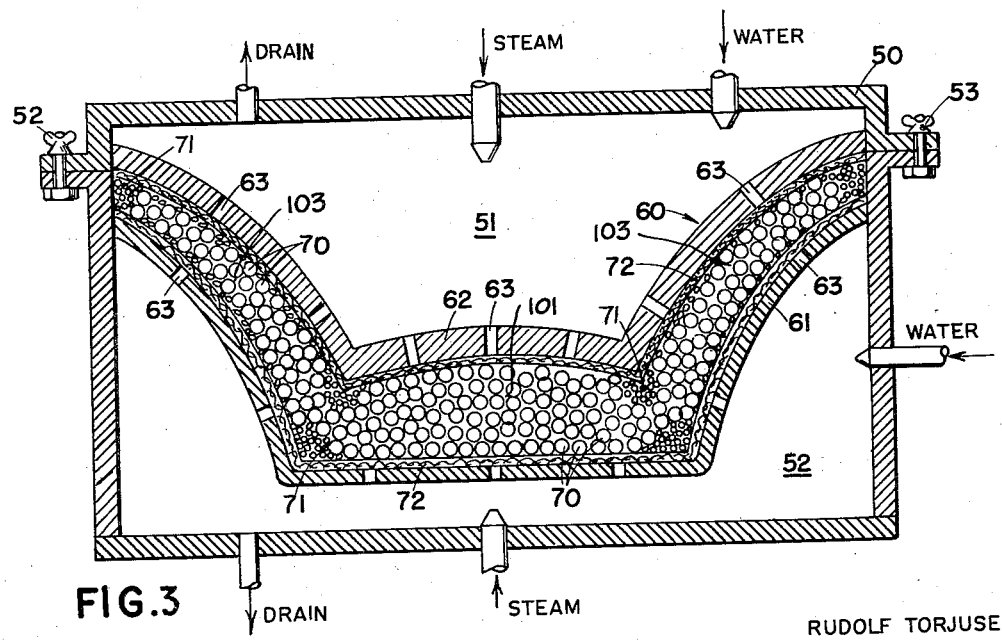
FIG. 3 is a somewhat schematic cross-sectional view of a mold adapted to be used with the process illustrated in FIG. 2.

The steps of the process according to the invention will be further described with reference to FIG. 3 which shows one particular type of mold adapted to be used with the present invention. The mold, schematically shown as suitable to produce a chair similar to that depicted in FIG. 1, is sectioned generally in the plane P of FIG. 1 to illustrate the formation of the seat and armrest portions of the chair. Pre-expanded beads from drying chamber 30 (FIG. 2) are blown into the mold 60 which has been previously lined with a fabric 72 to produce the desired surface finish on the shell. The cavity of mold 60 is enclosed by a female mold half 61 and a male mold half 62, each of which is provided with perforations 63 interconnecting the mold cavity with the steam chambers 51 and 52 defined by the steam chest 50. The chest 50 is provided with clamping means, schematically shown as butterfly nuts 53 and 54, to close the mold and the chest. The unexpanded beads 71, taken directly from their source, are placed at various locations where a plastic material of greater density is desired, this being done prior to the charging of the mold with the pre-expanded beads 70. The latter beads are deposited throughout the seat-forming portion 101 and at the center of the armrest-forming portions 103 of the mold cavity. The mold is then closed and steam introduced into the steam chest and permitted to penetrate the mold cavity for a length of time sufficient to expand the unexpanded beads to a limited extent and to fuse the plastic mass into an integral shell. Water is then admitted to cool the mold and the shell is thereafter removed for drying. The fabric 72 enclosing the completed shell may be sized to exhibit the desired finish. It will be apparent that the furniture shell thus produced will be suitable for use without further upholstering.

*Example*

Expandable polystyrene beads of 30 to 40 U.S. mesh (between 10 and 30 microns), whose density is approximately 0.30 gm./cc., are expanded to a density of 0.03 gm./cc. upon admixture with steam at a pressure of 2.4 atmospheres (gauge) and a temperature of 135° C., in pre-expansion chamber 20. The beads are dried in chamber 30 by exposure to air, for a minimum of one day, and then delivered to the mold 60 which has previously been lined with burlap and within which unexpanded beads have been deposited at regions where greater density is required. Steam at a pressure of 1.7 atmospheres (gauge) and at a temperature of 115° C. is admitted to the steam chest 50 surrounding the mold and permitted to permeate for 100 seconds the polystyrene beads contained therein. Water is then admitted to the steam chest to cool the mold to room temperature and the shell is removed from the mold cavity. The finished shell is permitted to dry in air for a period of not less than 24 hours, after which the burlap covering is sized with polyvinyl-acetate glue.

The density of the polystyrene beads after expansion may be varied by lengthening or diminishing the pre-expansion period or by the use of steam under higher or lower pressures and temperatures. The pre-expansion steam pressure, for example, may range between 2 and 3 atmospheres (gauge), while the temperatures may range between 105° C. and 150° C. Steam may be admitted under higher pressures to the steam chest if thick shells are to be formed, and the length of exposure to the steam in the mold may range between 60 and 120 seconds depending upon the shell thickness.

It will be apparent to persons skilled in the art that the above-described process may be modified, e.g. to utilize various types of equipment presently available, without departing from the spirit and scope of the invention, except as further limited in the accompanying claims.

I claim:

1. An article of furniture comprising a body-supporting portion and a frame portion peripherally surrounding and merging into said body-supporting portion being integral with said body-supporting portion, said frame portion comprising a core of a plastic material subjected to a substantial degree of expansion and a relatively rigid layer of like material subjected to a more limited degree of expansion fused to said core, said body-supporting portion consisting of a relatively deformable mass of said material subjected to a degree of expansion substantially equal to that of said core and being supported by said frame portion.

2. An article of furniture comprising a body-supporting portion, a frame portion peripherally surrounding and merging into said body-supporting portion, and a pliable layer covering said portions and firmly bonded thereto, said frame portion being integral with said body-supporting portion while comprising a core of a plastic material subjected to a substantial degree of expansion and a relatively rigid layer of like material subjected to a more limited degree of expansion fused to said core, said body-supporting portion consisting of a relatively deformable mass of said material subjected to a degree of expansion substantially equal to that of said core and being supported by said frame portion.

3. An article of furniture comprising a body-supporting portion, a frame portion peripherally surrounding and merging into said body-supporting portion, and a woven fabric layer completely surrounding said portions and firmly bonded thereto, said frame portion being integral with said body-supporting portion while comprising a core of a plastic material subjected to a substantial degree of expansion and a relatively rigid layer of like material subjected to a more limited degree of expansion fused to said core, said body-supporting portion consisting of a relatively deformable mass of said material subjected to a degree of expansion substantially equal to that of said core and being supported by said frame portion.

4. An article of furniture comprising a body-supporting seat portion and a frame portion peripherally surrounding said portion, said frame portion including a pair of armrest portions integral with and merging into said body-supporting portion, said armrest portions each comprising a core of a plastic material subjected to a substantial degree of expansion and a relatively rigid layer of like material subjected to a more limited degree of expansion fused to said core, said body-supporting portion consisting of a relatively deformable mass of said material subjected to a degree of expansion substantially equal to that of said core, additional quantities of said material subjected to said more limited degree of expansion being disposed in junction regions between said armrest portions and said body-supporting portions.

References Cited in the file of this patent

UNITED STATES PATENTS

| | | |
|---|---|---|
| 1,397,842 | Netzel | Nov. 22, 1921 |
| 2,071,647 | Miller | Feb. 23, 1937 |
| 2,150,287 | Minor | Mar. 14, 1939 |
| 2,381,380 | Carter | Aug. 7, 1945 |
| 2,767,436 | Noland | Oct. 23, 1956 |
| 2,787,809 | Stastny | Apr. 9, 1957 |
| 2,802,766 | Leverenz | Aug. 13, 1957 |
| 2,818,107 | Thaden | Dec. 31, 1957 |
| 2,838,100 | Follows | June 10, 1958 |
| 2,865,800 | Stastny | Dec. 23, 1958 |
| 2,950,505 | Frank | Aug. 30, 1960 |
| 2,954,589 | Brown | Oct. 4, 1960 |